(12) United States Patent
Sun et al.

(10) Patent No.: US 9,397,333 B2
(45) Date of Patent: Jul. 19, 2016

(54) METHOD FOR MANUFACTURING CARBON-SULFUR COMPOSITE, CARBON-SULFUR COMPOSITE MANUFACTURED THEREBY, AND LITHIUM-SULFUR BATTERY

(75) Inventors: Yang Kook Sun, Seoul (KR); Hun Gi Jung, Busan (KR); Jung Hoon Kim, Anyang-si (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 0 days.

(21) Appl. No.: 14/122,516

(22) PCT Filed: May 31, 2012

(86) PCT No.: PCT/KR2012/004315
§ 371 (c)(1),
(2), (4) Date: Dec. 16, 2013

(87) PCT Pub. No.: WO2012/165884
PCT Pub. Date: Dec. 6, 2012

(65) Prior Publication Data
US 2014/0099536 A1    Apr. 10, 2014

(30) Foreign Application Priority Data

May 31, 2011    (KR) .................... 10-2011-0052383

(51) Int. Cl.
*H01M 4/36*    (2006.01)
*H01M 10/0569*  (2010.01)
(Continued)

(52) U.S. Cl.
CPC ............ *H01M 4/366* (2013.01); *H01M 4/5815* (2013.01); *H01M 10/0569* (2013.01); *H01M 10/052* (2013.01)

(58) Field of Classification Search
CPC ....... H01M 4/583; H01M 4/13; H01M 4/137; H01M 4/139; H01M 4/1399; H01M 10/05; H01M 10/056; H01M 10/26; H01M 4/664; H01M 4/663; H01M 4/0416; H01M 10/026
USPC ............. 429/188, 231.8, 300, 322, 341, 199, 429/206; 427/77; 252/182.1
See application file for complete search history.

(56) References Cited

U.S. PATENT DOCUMENTS

2011/0052998 A1*  3/2011  Liang .................. C01B 31/12
                                            429/300
2013/0330619 A1* 12/2013  Archer ................. H01M 4/136
                                            429/213

FOREIGN PATENT DOCUMENTS

CN      101645500 A    2/2010
JP      2010-095390 A  4/2010

OTHER PUBLICATIONS

C. Lai et al; Synthesis and Electrochemical Performance of Sulfur/Highly Porous . . . ; J. Phys. Chem. C., Mar. 19, 2009; vol. 113; pp. 4712-4716.
(Continued)

*Primary Examiner* — Patrick Ryan
*Assistant Examiner* — Kiran Quraishi
(74) *Attorney, Agent, or Firm* — Lucas & Mercanti, LLP (57) ABSTRACT

The present invention relates to a method for manufacturing a carbon-sulfur composite, a carbon-sulfur composite manufactured by the method, and a lithium-sulfur battery including the same. In the carbon-sulfur composite manufactured by the method for manufacturing the carbon-sulfur composite, the sulfur is filled up to inside of the carbon balls, and thereby uniformly distributed. Accordingly, the sulfur content is increased, resulting to increase of capacity property, and also electrode structure does not collapse even though the sulfur is changed to a liquid phase while charging or discharging the battery, resulting to showing stable cycle property.

9 Claims, 11 Drawing Sheets

(51) Int. Cl.
*H01M 4/58* (2010.01)
*H01M 10/052* (2010.01)

(56) References Cited

OTHER PUBLICATIONS

Y.J. Kim et al; Effects of sulfuric acid treatment on the microstructure and electrochemical . . . ; Carbon, Oct. 14, 2004; vol. 43; pp. 163-169.
International Search Report of PCT/KR2012/004315 dated Jan. 3, 2013.
B. Zhang, et al. "Enchangement of long stability of sulfur cathode by encapsulating 2 sulfur into micropores of carbon spheres" Energy Environ. Sci., 2010, 3, 1531-1537.
Shu-Ru Chen, et al. "Ordered mesoporous carbon/sulfur nanocomposite of high performances as cathode for lithium-sulfur battery" Electrochimica Acta 56 (2011) 9549-9555.
B Zhang, at al., "Preparation and electrochemical properties of sulfur-acetylene black composites as cathode materials" Electrochimica Acta 54 (2009) 3708-3713.
European Search Report dated Oct. 8, 2014 for Application No. EP 12794098.

* cited by examiner

HSC (Hard Sulfur Carbon)

Fig. 1(B)

S (sulfur)

Fig. 1(C)

Composite

METHOD FOR MANUFACTURING CARBON-SULFUR COMPOSITE, CARBON-SULFUR COMPOSITE MANUFACTURED THEREBY, AND LITHIUM-SULFUR BATTERY

CROSS-REFERENCE TO RELATED APPLICATIONS

This application is a 371 of PCT/KR2012/004315, filed May 31, 2012, which claims the benefit of Korean Patent Application No. 10-2011-052383, filed May 31, 2011, the contents of each of which are incorporated herein by reference.

FIELD OF THE INVENTION

The present disclosure relates to a method for manufacturing a carbon-sulfur composite, a carbon-sulfur composite manufactured thereby, and a lithium-sulfur battery comprising the same.

BACKGROUND OF THE INVENTION

The demand for secondary batteries is increasing according to rapid development of mobile electronic devices. Particularly, batteries having high energy density are continually required to meet trends in reduction in size, weight and thickness of mobile electronic devices, and batteries, which are needed to satisfy chip, safe and environment-friendly aspects.

Lithium-sulfur batteries are secondary batteries, which use sulfur-based compounds having sulfur-sulfur combination as a positive electrode active material, and carbon-based materials, where alkali metals like lithium or metal ion like lithium ions may be inserted, as a negative electrode active material. The batteries store and produce electrical energy by using oxidation-reduction reaction, wherein the oxidation number of S is reduced by cleavage of S—S bond during reduction (when discharging), and the oxidation number is increased by reformation of the S—S bond during oxidation (when charging).

However, there is no successful example of commercialization of the lithium-sulfur battery system yet. The reason is that when using sulfur as an active material, the usage of the sulfur used in the electrochemical oxidation-reduction reaction in a battery to the added amount of the sulfur is low, and therefore, only very low battery capacity relative to the theoretical capacity is achieved.

Further, in general, sulfur atom is a non-conducting material not having electroconductivity. Therefore, an electrically conductive material, which can provide a smooth electrochemical reaction site, should be used in order for the electrochemical reaction to occur. Positive electrode structures using the sulfur atom, which have been known so far, have a structure, wherein sulfur and carbon powder as a conducting material exist independently and simply mixed in a positive electrode active material layer (mix) as described in U.S. Pat. Nos. 5,523,179 and 5,582,623. However, in this structure, the sulfur and the carbon powder as a conducting material are simply mixed. Accordingly, when charging or discharging, the sulfur is converted to polysulfide, and then flows out to an electrolyte as a liquid phase, resulting in collapse of the electrode structure. Accordingly, it has bad influence to capacity and life cycle property of a lithium-sulfur battery.

In order to solve the above problems, a method for delaying flowing out of a positive electrode active material by adding an additive, which can adsorbs sulfur, to positive electrode active material slurry is being studied. As an adsorbent for this purpose, in Japanese Patent Application Publication No. H9-147868 (Jun. 6, 1997), an active carbon fiber was used, and in U.S. Pat. No. 5,919,587, a method filling a positive electrode active material between transition metal chalcogenides, which are highly porous and have fibrous and ultrafine sponge like structure, or encapsulating the positive electrode active material with the transition metal chalcogenides was disclosed. However, these prior arts had a problem that capacity property and life cycle property of the lithium-sulfur battery are not largely enhanced.

SUMMARY OF THE INVENTION

In order to solve the above-mentioned problems, the present invention provides a novel method for manufacturing a carbon-sulfur composite, which can enhance capacity property and life cycle property of a lithium-sulfur battery Further, the present invention is objected to provide a carbon-sulfur composite manufactured by the said method, and a lithium-sulfur battery comprising the same.

In order to solve the above aspects, the present invention provides a method for manufacturing a carbon-sulfur composite, which comprises the steps of:
 a) preparing hard carbon balls;
 b) mixing the hard carbon balls and sulfur;
 c) filling the sulfur in the hard carbon balls by heating the mixture of the hard carbon balls and the sulfur at the first temperature;
 d) cooling the sulfur-filled hard carbon balls to the room temperature; and
 e) heating the sulfur-filled hard carbon balls at the second temperature under a certain pressure.

In the present invention, in the step of mixing the hard carbon balls and the sulfur, it is characterized that the sulfur is mixed in an amount of 50 to 150 parts per weight based on the hard carbon 100 parts by weight. When the amount of the sulfur is less than 50 parts by weight, the amount of the sulfur filled in the carbon-sulfur composite is insufficient, and when the amount of the sulfur is over 150 parts per weight, the sulfur is not filled in the carbon-sulfur composite anymore.

In the present invention, in the step of heating the mixture of the hard carbon balls and the sulfur at the first temperature, it is characterized that the mixture of the hard carbon balls and the sulfur is heated at the temperature of 130 to 170° C., so as to make the sulfur react with the hard carbon balls from the surface to the inside of the hard carbon balls while being filled. When the first heating temperature is less than 130° C. or over 170° C., it is not preferred because the sulfur is not filled in the carbon balls, or vaporized even if filled.

In the present invention, in the step of heating the sulfur-filled hard carbon balls at the second temperature under a certain pressure, it is characterized that the sulfur-filled hard carbon balls are heated at the temperature of 250 to 350° C. under the pressure of 1.5 to 2.0 MPa. By heating at the second temperature, a hard carbon ball, in which the sulfur is uniformly filled, can be obtained by filling the sulfur in the carbon balls by applying the pressure of 1.5 to 2.0 MPa without vaporizing the sulfur filled in the carbon balls, as well as removing the sulfur remained on the surface.

In the present invention, the hard carbon balls can be manufactured by a general process for manufacturing a hard carbon, and diameter thereof may be 300 nm to 5 μm.

Further, the present invention provides a carbon-sulfur composite manufactured by the method of the present invention.

The carbon-sulfur composite of the present invention is characterized that it contains the sulfur in an amount of 40 to 50 weight % in the particle, and the sulfur is uniformly distributed from the center to the surface of the particle. When the sulfur is contained in the carbon-sulfur composite in an amount of 50 wt %, the carbon and the sulfur combine at the ratio of 1:1.

Diameter of the carbon-sulfur composite may be 300 nm to 5 μm. The diameter of the carbon-sulfur composite is identical with the diameter of the carbon balls, and the diameter of the carbon balls is not changed even if the sulfur is filled therein.

The carbon-sulfur composite of the present invention is characterized by having two weight loss temperatures during Thermogravimetric Analysis. The first weight loss temperature is shown at 150 to 160° C., and the second weight loss temperature is shown at 250 to 270° C. The first weight loss temperature is around the melting point of the sulfur, where the sulfur existing on the surface of the carbon-sulfur composite is melting, and the second weight loss temperature is the temperature, where the sulfur exists in the carbon-sulfur composite is melting.

The present invention further provides a positive electrode for a lithium-sulfur battery comprising the said carbon-sulfur composite, and a lithium-sulfur battery comprising the same.

The lithium-sulfur battery of the present invention is characterized by showing potential plateau at 2.0 V or higher.

The organic solvent, which can be used for the non-aqueous electrolyte of the lithium-sulfur battery according to the present invention may contain polyether, but not limited thereto. The polyether, which can be used in the present invention, may be diethylene glycol dimethyl ether, triethylene glycol dimethyl ether, tetraethylene glycol dimethyl ether, higher glyme, ethylene glycol divinyl ether, diethylene glycol divinyl ether, triethylene glycol divinyl ether, dipropylene glycol dimethylene ether and butylene glycol ether, but not limited thereto, and the tetraethylene glycol dimethyl ether is preferred due to its high ion conductivity and low volatility.

Further, in the non-aqueous electrolyte secondary battery of the present invention, the lithium salt added to the non-aqueous electrolyte solution may be any one, which has been generally used as an electrolyte for the existing non-aqueous electrolyte secondary battery, and for example, at least one selected from the group consisting of $LiBF_4$, $LiPF_6$, $LiCF_3SO_3$, $LiC_4F_9SO_3$, $LiN(CF_3SO_2)_2$, $LiN(C_2F_5SO_2)_2$, $LiN(CF_3SO_2)(COCF_3)$, $LiAsF_6$ can be used.

Further, in each non-aqueous electrolyte secondary battery of the present invention, as a negative electrode, a material inserting or deinserting the lithium may be any material generally used for conventional non-aqueous electrolyte solution secondary batteries, for example lithium metal, lithium alloy or carbon material such as graphite. However, in order to obtain a non-aqueous electrolyte secondary battery having high energy density, it is preferred to use a lithium-alloyed silicone as disclosed in Korean Patent Application No. 10-2011-0028246 of the present applicants.

Advantageous Effects of the Invention

In the carbon-sulfur composite manufactured by the method for manufacturing the carbon-sulfur composite of the present invention, the sulfur is filled up to inside of the carbon balls, and thereby uniformly distributed. Accordingly, the sulfur content is increased, resulting to increase of capacity property, and also electrode structure does not collapse even though the sulfur is changed to a liquid phase while charging or discharging the battery, resulting to showing stable cycle property.

BRIEF DESCRIPTION OF DRAWINGS

The above and other objects and features of the present invention will become apparent from the following description of the invention taken in conjunction with the following accompanying drawings, which respectively show.

DETAILED DESCRIPTION OF THE INVENTION

Hereinafter, Examples and Comparative Example will be described. The Examples are presented for illustrative purposes only, and do not limit the present invention.

Example 1

Manufacture of Hard Carbon Balls

Sugar was dissolved in water at the concentration of 1.5 M, and then heated in an autoclave at 190° C. for 5 hrs. The obtained slimy was filtered, washed with ethanol, dried at 100° C. for 24 hrs, and then annealed at 1000° C. for 2 hrs under nitrogen atmosphere to manufacture hard carbon halls.

Example 2

Manufacture of Carbon-Sulfur Composite

The hard carbon balls obtained in Example 1 and sulfur were mixed at the weight ratio of 1:5. In order to fill the sulfur in the hard carbon halls, the first heat-treatment was conducted in a sealed flask at 150° C. for 7 hrs under Ar atmosphere, and then the resulting mixture was cooled to room temperature.

Then, the mixture was heated at 300° C. for 2 hr while applying the pressure of 1 MPa, 1.5 Mpa and 2.0 Mpa, respectively each of Examples 2-1, 2-2 and 2-3) to manufacture a carbon-sulfur composite, wherein the sulfur was filled in the carbon ball.

Example 3

Manufacture of Electrode and Battery

The carbon-sulfur composite, which was manufactured by applying 1.5 Mpa pressure during the second heat-treatment in Example 2-2, a carbon black conducting material and polyethylene oxide binder were mixed in acetonitrile solvent at the ratio of 60:20:20 to manufacture slurry. The prepared slurry was coated on an aluminum foil to the thickness of 40 μm, roll-pressed, and then dried at 50° C. for removing residual solvent.

A lithium-sulfur battery was manufactured by using the obtained positive electrode plate and a lithium foil negative electrode. At this time, as an electrolyte solution, a solution manufactured by dissolving $LiSO_3CF_3$ in tetraethyleneglycol dimethylether (TEGDME) at the ratio of 4:1, was used.

The above procedure was repeated for the other carbon-sulfur composites having different applied pressure manufactured in Examples 2-2 and 2-3 to manufacture lithium-sulfur batteries.

Test Example 1

Scanning Electron Microscopy

Figures 1, 1A, 1B, 1C:
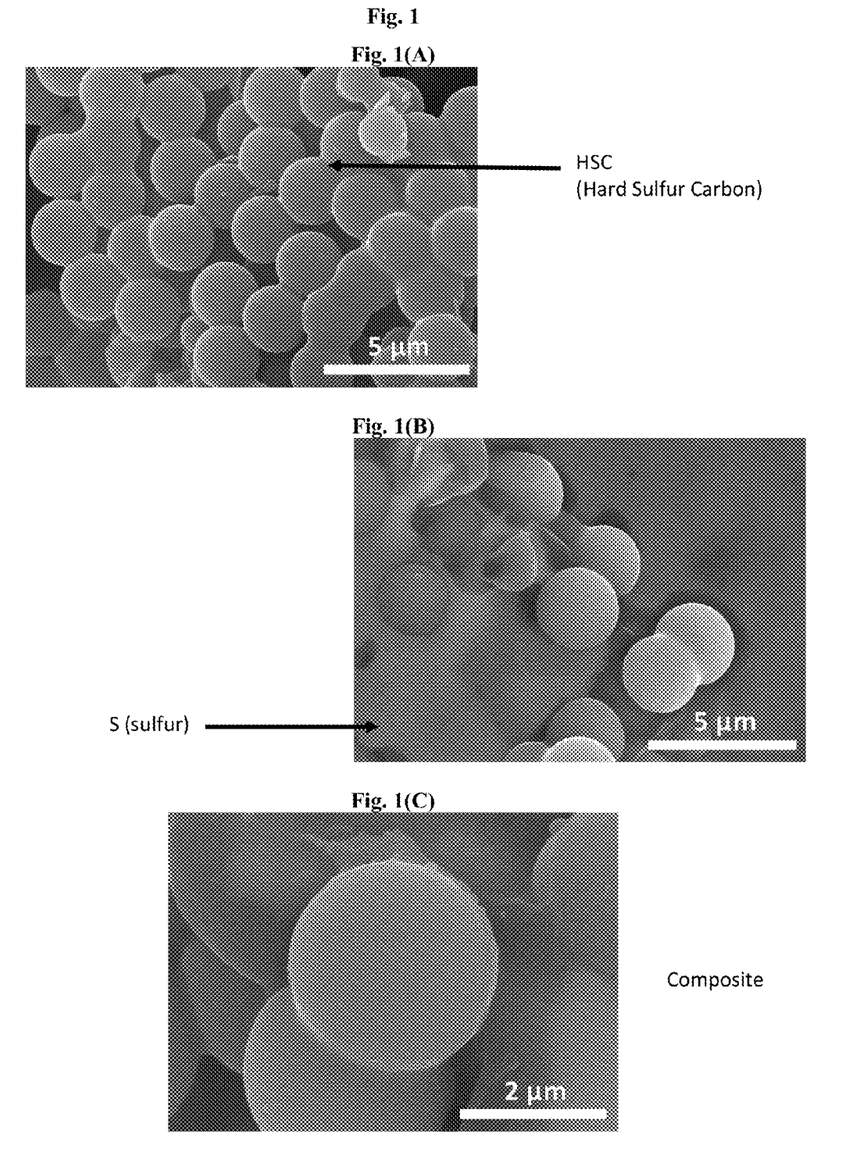
FIG. 1a: an SEM image of the hard carbon balls obtained in Example 1 of the present invention.
FIG. 1b: an SEM image of the sulfur-filled hard carbon balls after the first heat-treatment of Example 2.
FIG. 1c: an SEM image of the particles produced after the second heat-treatment under the pressure of 1.5 MPa.

An SEM image of the hard carbon balls obtained in Example 1 of the present invention, an SEM image after the first heat-treatment of the sulfur and the hard carbon balls in Example 2, and an SEM image after mixing the sulfur and the hard carbon balls followed by conducting the second heat-treatment while applying the pressure of 1.5 Mpa were shown in FIG. 1a, FIG. 1b and FIG. 1c, respectively.

As shown in FIG. 1b, when conducting the first heat-treatment after mixing the carbon balls and the sulfur, excess sulfur was remained around the carbon-sulfur composites, but as shown in FIG. 1c, the sulfur was disappeared and spherical crystal structure was formed after the second heat treatment.

Test Example 2

Measuring Sulfur Distribution by Energy Dispersive X-ray (EDX)

The carbon-sulfur composite obtained in Example 2-2 was cut in half with Focused Ion Beam, and its internal section was observed by a Scanning Electron microscope (SEM) equipped with Energy Dispersive X-ray (EDX) (hereinafter, called SEM/EDX). The result was shown in FIG. 2.

Figure 2:
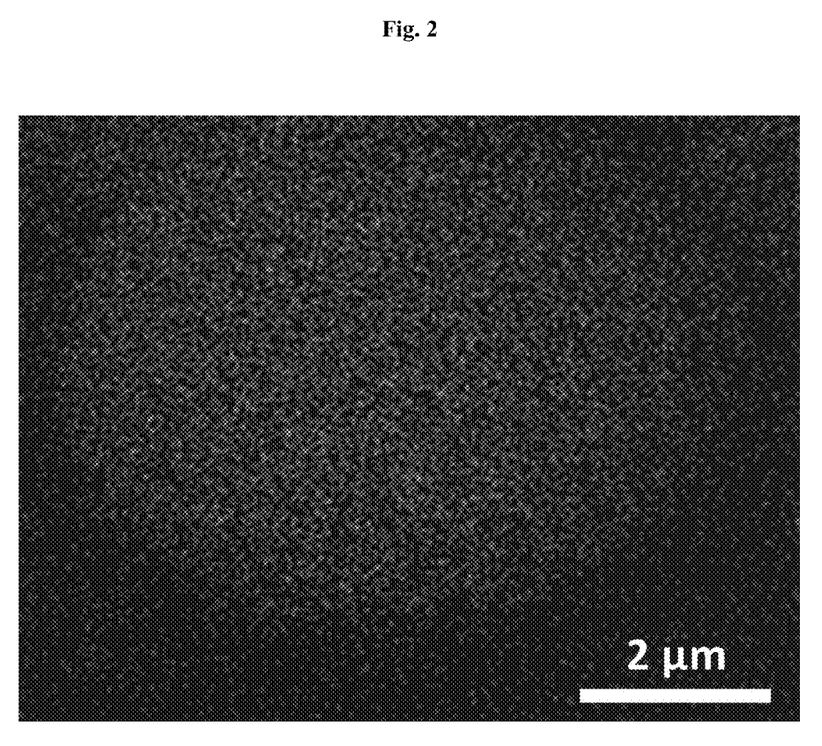
FIG. 2: the result of measuring sulfur distribution in the carbon-sulfur composite by using an energy dispersive X-ray (EDX)

As shown in FIG. 2, in the case of the particle obtained in Example 2-2 by heat-treatment under the pressure of 1.5 Mpa, it was confirmed that the sulfur was uniformly filled in the composite from the center to the surface of the particle.

Test Example 3

Measuring Powder X-ray Diffraction (XRD) Pattern

Figure 3:
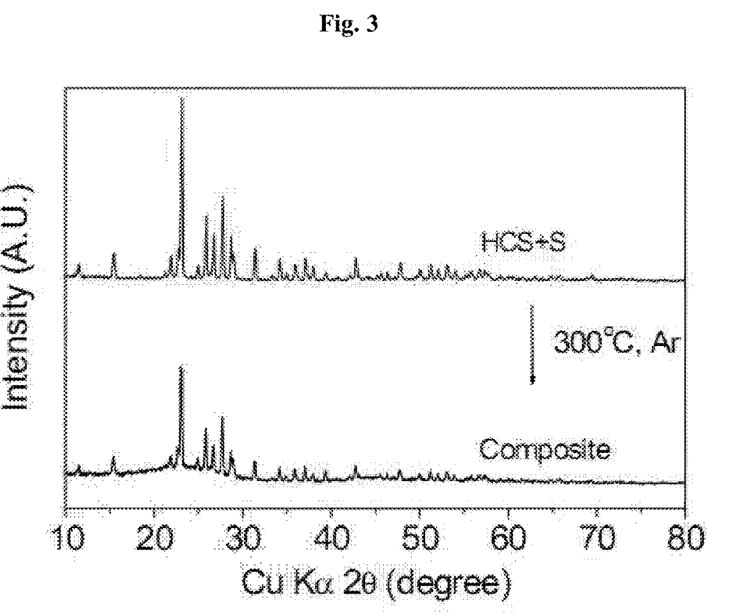
FIG. 3: X-ray diffraction (XRD:) pattern measured against the composite of Example 2 of the present invention, which is manufactured by simply mixing carbon-sulfur followed by heating while applying a certain pressure.

X-ray diffraction (XRD) parterres measured against the carbon-sulfur composites manufactured by simply mixing the carbon balls and the sulfur, and by mixing the carbon ball and the sulfur followed by the second heat-treatment under a certain pressure in Example 2-2, respectively, were shown in FIG. 3.

As shown in FIG. 3, there was no change on XRD pattern in the case of simply mixing the carbon and the sulfur, and the case of heating thereof after mixing, and it shows that the sulfur was uniformly filled in the carbon ball and formed one composite.

Test Example 4

Thermogravimetric Analysis

TGA was measured against the carbon-sulfur composites manufactured in Examples 2-1 to 2-3, and temperatures at the points of changes on the content and the weight loss of the sulfur contained in the carbon-sulfur composites were confirmed. TGA measurement was conducted under nitrogen condition, and mass change was measured by continuously raising temperature at the rate of 10° $C.\cdot min^{-1}$. A graph of the results of measuring TGA was shown in FIG. 4.

Figure 4:
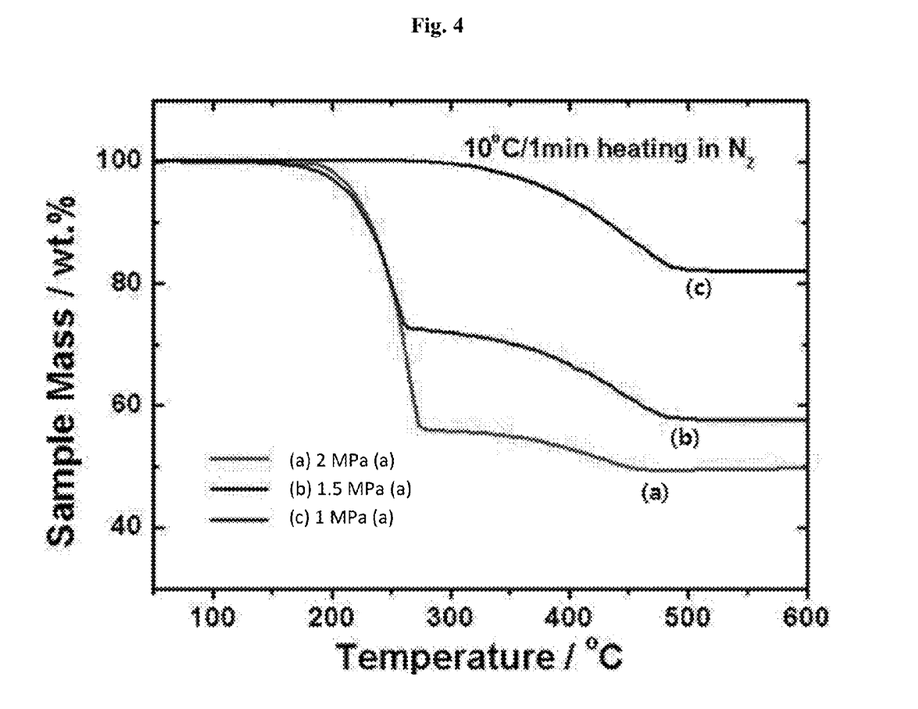
FIG. 4: the result of measuring TGA of the composite, which is manufactured by mixing carbon balls and sulfur followed by heating at the second temperature while applying a certain pressure in one Example of the present invention.

As shown in FIG. 4, in the case of applying the pressure of 1.5 Mpa and 2 MPa when heating, the weight loss points were found at two points of 160° C. and 260° C., but in the case of applying the pressure of 1.0 Mpa, the weight loss point was found at only one point. From these results, it can be found the sulfur was not completely filled up to the inside of the composite in the case of applying the pressure of less than 1.0 MPa when conducting the second heat-treatment.

In the case of applying the pressure of 1.5 Mpa, it is judged that, at the two weight loss points, weight was reduced, as the sulfur on the surface was melted at 160° C. around the melting point of the sulfur, 149° C. and the sulfur inside of the structure was melted at 260° C.

In the case of applying the pressure of 1.5 Mpa when conducting the second heat-treatment, the weight was reduced up to 40%, and in the case of applying the pressure of 2 Mpa, the weight was reduced up to 50%. Accordingly, it can be found that the amount of the sulfur filled in the carbon balls was increased as the applied pressure was increased during the second heat-treatment, and the sulfur of 40 wt % to 50 wt % based on the total carbon-sulfur composite was filled.

Test Example 5

Evaluation of Battery Charging/Discharging Property

Figure 5A:
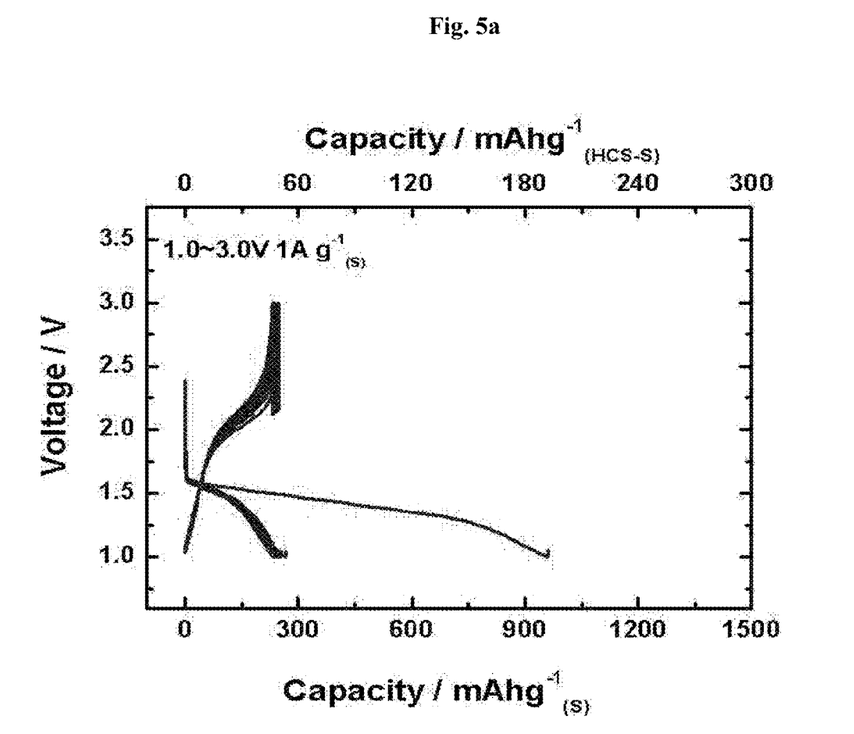
FIG. 5: the result of charging/discharging test depending on current density against the battery containing the carbon-sulfur composite of Example 2-2 of the present invention, which is manufactured by applying the pressure of 1.5 Mpa during the second heat-treatment.
Figure 5B:
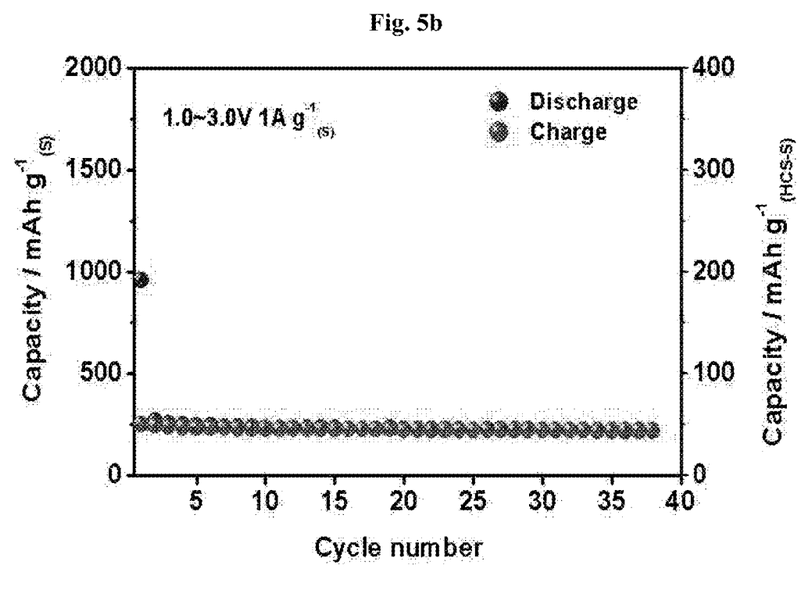

Charging/discharging test depending on current density against a battery containing the carbon-sulfur composite of Example 2-2, which was manufactured by applying the pressure of 1.5 Mpa when conducting the second heat-treatment, was conducted, and the result was shown in FIG. 5. As shown in FIG. 5, in the case of applying the positive electrode containing the carbon-sulfur composite of the present invention, potential plateau was shown at 2.0 V or more.

Figure 6A:
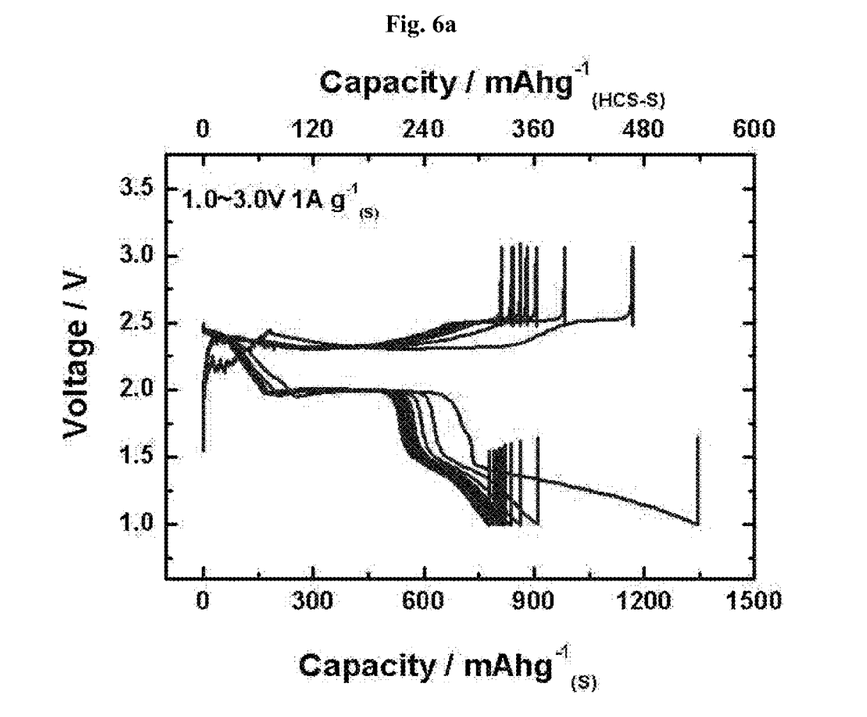
FIG. 6: the result of initial charging/discharging, test and life cycle property of the battery of Example 2-1 of the present invention.
Figure 6B:
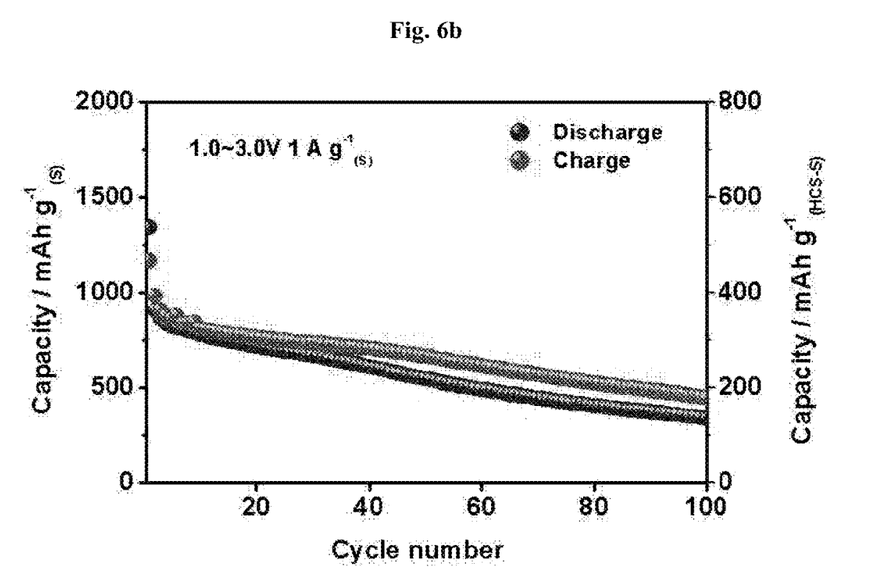
Figure 7A:
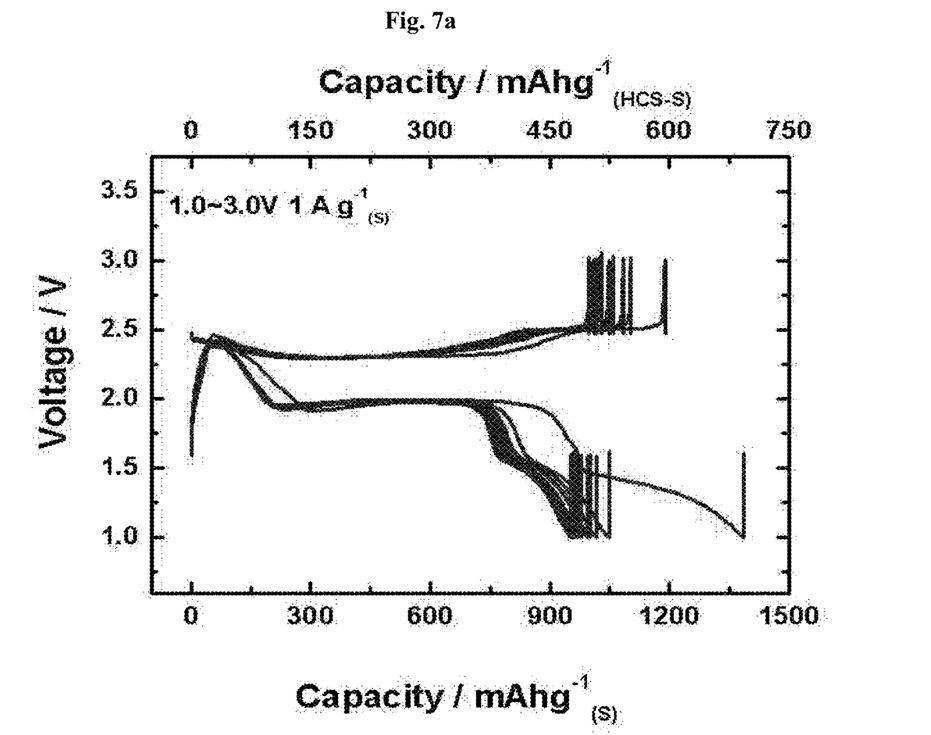
FIG. 7: the result of initial charging/discharging test and life cycle property of the battery of Example 2-2 of the present invention.
Figure 7B:
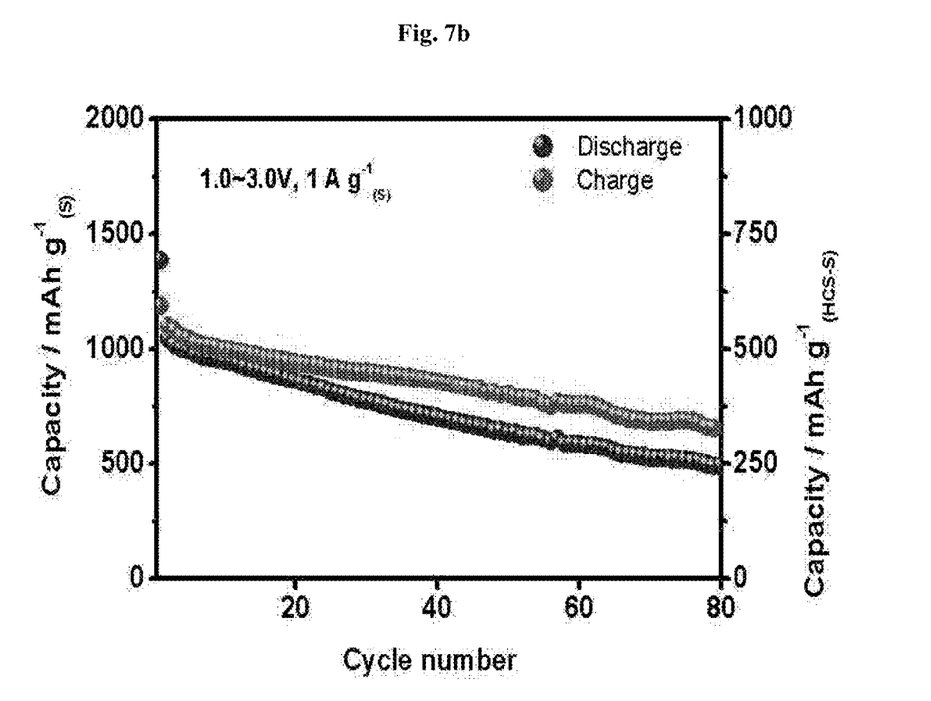
Figure 8:
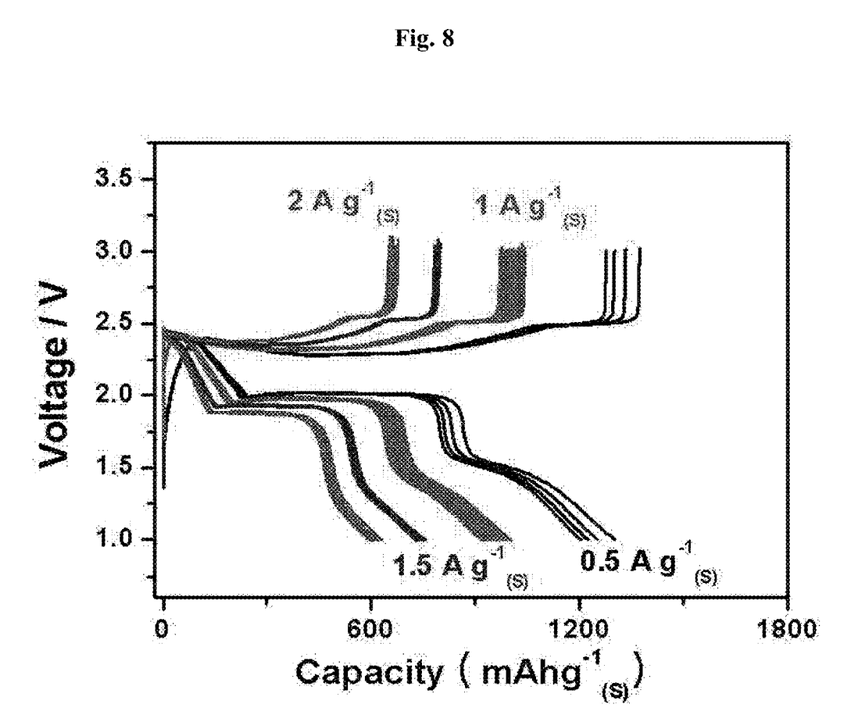
FIG. 8: the result of initial charging/discharging test and life cycle property of the battery of Example 2-3 of the present invention.

The results of charging/discharging test after the initial 10 cycles and 40 cycles of the battery of Example 2-1 by the applied pressure of 1 Mpa when conducting the heat-treatment was shown in FIG. 6; the results of charging/discharging test after the initial 10 cycles and 40 cycles of the battery of Example 2-2 by the applied pressure of 1.5 Mpa was shown in FIG. 7; and the results of charging/discharging test after the initial 10 cycles and 40 cycles of the battery of Example 2-3 by the applied pressure of 2 Mpa was shown in FIG. 8.

As shown in FIG. 6 to FIG. 8, the potential plateau was not shown in the case of applying the pressure of 1 Mpa when conducting the second heat-treatment, but the potential plateau was shown in the case of applying the pressure of 1.5 Mpa or more when conducting the second heat-treatment. And, it can be found that the initial discharging capacity was increased as the applied pressure was increased when conducting the second heat-treatment.

Further, in FIG. 6 showing the result of the case of applying the pressure of 1.0 Mpa, not forming the carbon-sulfur composite, the initial capacity o was maintained after 40 cycles but the capacity was just 250 mAh/g. However, in the case of FIG. 7 and FIG. 8 of applying the pressure of 1.5 Mpa or more, the initial capacity was not maintained, but the capacity of 500 mAh/g, which is higher than the capacity of 250 mAh/g of the case applying the pressure of 1.0 Mpa, not forming the carbon-sulfur composite, of FIG. 6, was maintained after 100 cycles. Accordingly, it can be found that the carbon-sulfur composite according to the present invention has excellent cycle life property and capacity property.

While the invention has been described with respect to the above specific embodiments, it should be recognized that various modifications and changes may be made and also fall within the scope of the invention as defined by the claims that follow.

What is claimed is:

1. A method for manufacturing a carbon-sulfur composite, which comprises the steps of:
   a) preparing a plurality of carbon balls;
   b) mixing the carbon balls and sulfur;
   c) filling the sulfur in the carbon balls by heating the mixture of the carbon balls and the sulfur under gas atmosphere at a temperature of 130 to 170° C.
   d) cooling the sulfur-filled carbon balls to room temperature; and
   e) heating the sulfur-filled carbon balls at a temperature of 250 to 350° C. under a pressure of 1.5 to 2.0 Mpa.

2. The method for manufacturing a carbon-sulfur composite according to claim 1, wherein, in the step of mixing the carbon balls and the sulfur, the sulfur is mixed at the ratio of 50 to 150 parts per weight based on the carbon 100 parts by weight.

3. The method for manufacturing a carbon-sulfur composite according to claim 1, wherein diameter of the carbon balls is 300 nm to 5 µm.

4. A carbon-sulfur composite prepared by the method according to claim 1,
   wherein
   the carbon-sulfur composite has two weight loss periods during Thermogravimetric Analysis, wherein starting temperatures of the two weight loss periods are from 120 to 200° C. and from 220 to 300° C. each, and wherein a weight of the carbon-sulfur composite after a first weight loss period is from 50 to 75 wt % based on the carbon-sulfur 100 wt %; and
   the sulfur is uniformly distributed from the center to the surface of the particle.

5. The carbon-sulfur composite according to claim 4, which comprises the sulfur in an amount of 40 to 50 weight % in the particle.

6. The carbon-sulfur composite according to claim 4, wherein diameter of the carbon-sulfur composite is 300 nm to 5 µm.

7. A positive electrode for a lithium-sulfur battery comprising the carbon-sulfur composite of claim 4.

8. A lithium-sulfur battery comprising the positive electrode for a lithium-sulfur battery of claim 7.

9. The lithium-sulfur battery according to claim 8, which comprises tetraethylene glycol dimethyl ether as an electrolyte.

* * * * *